(12) United States Patent
Nitz et al.

(10) Patent No.: US 7,129,826 B2
(45) Date of Patent: Oct. 31, 2006

(54) LOCALIZED ACCIDENT NOTIFICATION

(75) Inventors: Karl H. Nitz, Johnsburg, IL (US);
Gary L. Boushek, Glenview, IL (US);
Kenneth J. Klimek, Lake Forest, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/856,530

(22) Filed: May 28, 2004

(65) Prior Publication Data

US 2005/0275522 A1    Dec. 15, 2005

(51) Int. Cl.
*B60Q 1/00* (2006.01)
(52) U.S. Cl. .................. 340/436; 340/439; 340/440; 340/441; 340/471; 340/474; 340/531; 340/539.1; 180/274; 180/282; 280/735
(58) Field of Classification Search ................ 340/436, 340/440, 471, 474
See application file for complete search history.

(56) References Cited

U.S. PATENT DOCUMENTS 4,621,253 A    11/1986 Pillinger et al.
4,723,078 A *  2/1988 Neuffer et al. ............. 340/436
4,797,671 A *  1/1989 Toal, Jr. ................ 340/825.49
5,311,197 A    5/1994 Sorden et al.
5,736,925 A *  4/1998 Knauff et al. ............... 340/468
6,064,970 A *  5/2000 McMillan et al. ............. 705/4
6,275,146 B1 * 8/2001 Kithil et al. ............. 340/425.5
6,351,211 B1 * 2/2002 Bussard ....................... 340/468
6,587,042 B1   7/2003 Tabata et al.

\* cited by examiner

*Primary Examiner*—Benjamin C. Lee
(74) *Attorney, Agent, or Firm*—Brian M. Mancini; Indira Saladi

(57) ABSTRACT

A localized accident notification system includes an accident detector that detects a crash of a vehicle and an external alert system to provide an external alert by the vehicle that can be noticed by any people in the vicinity of the crash. Upon an indication of a crash from the accident detector a controller can direct the external alert. The external alert can have special notification properties. The accident detector may only operate if the vehicle ignition is on to discriminate between a theft alarm. The accident detector can include accelerometers, air bag detectors, or tilt sensors.

9 Claims, 1 Drawing Sheet

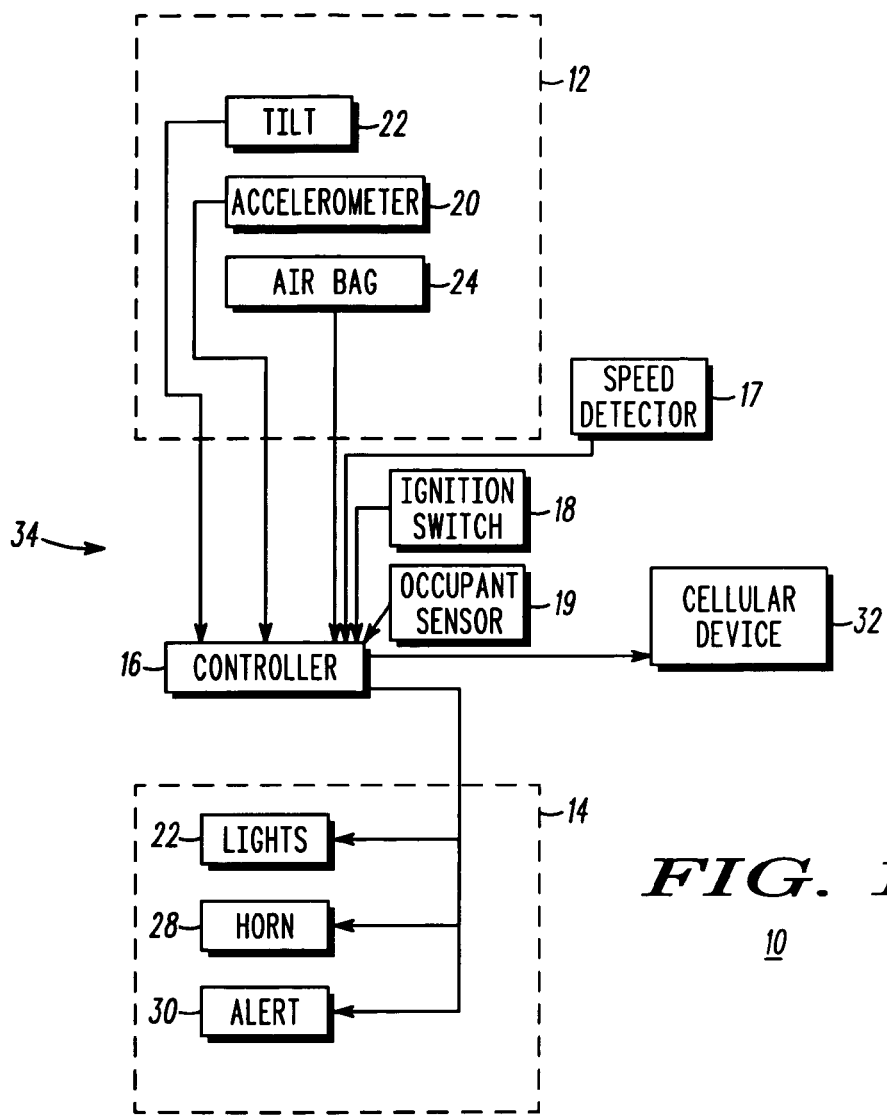
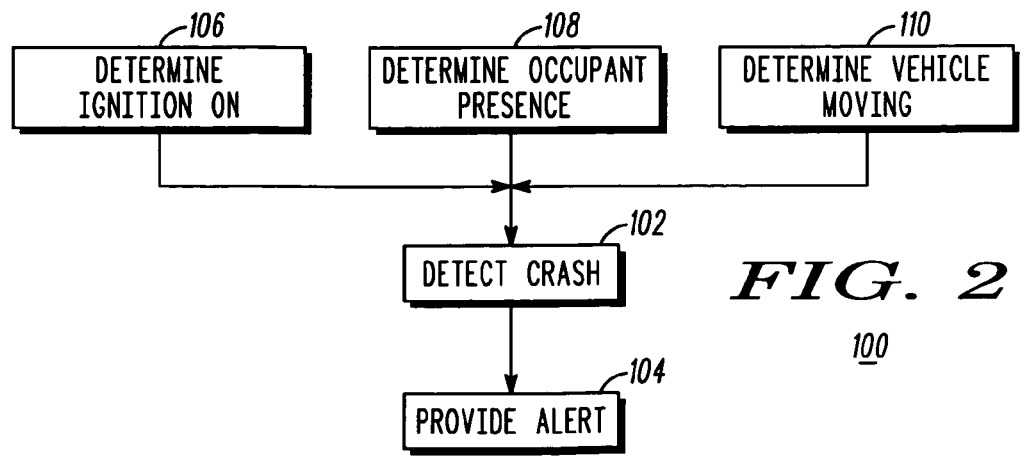

LOCALIZED ACCIDENT NOTIFICATION

FIELD OF THE INVENTION

This invention in general relates to determining a location of a vehicle after a accident, more particularly, to determining a location of a vehicle by persons at the site of the vehicle accident.

BACKGROUND OF THE INVENTION

It is important to provide prompt assistance to vehicles involved in accidents and serious crashes. In more severe crashes, a crash victim typically is unable to call for assistance. Moreover, in some cases, vehicles can not be immediately located after a crash, which prevents the immediate rendering of aid. For example, vehicles that crash in the dark, off the roadway, into a ditch, a ravine, water, or heavy brush, may not even be noticed by passers-by.

Some of this problem has been solved with the advent of cellular technology, wherein a vehicle within an onboard Telematics system, such as General Motor's OnStar™ system, can automatically call for assistance when airbags are triggered, for example. However, even in this case, help may not arrive immediately. Passers-by can render assistance sooner, but only if the vehicle is observable. In addition, not all vehicles have such onboard Telematics systems. In particular, motorcycles are particularly vulnerable to this accident scenario as these vehicles do not come equipped with onboard Telematics systems or air bags, they are more easily lost off a roadway, and there is a much higher likelihood that a driver would be injured and unable to call for help.

Therefore, it is desirable to provide a simpler approach that overcomes most, if not all, of the preceding problems. In particular, it would be beneficial if a simple, low-cost system could be supplied to provide a localized accident notification wherein passers-by could notice a vehicle after an accident and render immediate assistance.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

FIG. 1 shows a schematic diagram of a localized accident notification system, in accordance with the present invention; and FIG. 2 is a flow chart showing a method for providing localized accident notification, in accordance with the present invention.

DETAILED DESCRIPTION OF THE PREFERRED EMBODIMENT

The present invention provides a simple, low-cost system to provide localized accident notification wherein passers-by could notice a vehicle after an accident and render immediate assistance. In particular, the present invention provides a technique to sound a vehicle's horn and flash a vehicle's lights after an accident to summon assistance from passers-by. In this way, a crashed vehicle could be immediately noticed after the crash, even if the vehicle was off the roadway and hidden from view, thereby increasing the chances for survivability and minimizing the impact of injuries suffered.

The present invention could be supplied as a standalone system or used in conjunction with an existing cellular system. For example, the present invention could direct a user's portable cellphone, or a separately-supplied internal cellular communication device, to call for assistance. In addition, the present invention could be easily added to vehicles that have other assistance systems (e.g. OnStar™) such that assistance can be rendered as soon as possible. Further, the present invention could be added to such existing automobile architectures with little or no new hardware requirements.

Referring to FIG. 1, an apparatus 10 is shown for localized accident notification, in accordance with the present invention. In its simplest form, the apparatus 10 incorporates an accident detector 12 and external alert system 14 coupled with a controller 16. Upon an indication of a crash from the accident detector 12 the controller 16 directs the external alert system 14 to provide an external alert.

Preferably, the controller 16 is an existing controller in the vehicle (e.g. a system controller or a Telematics control unit) that is coupled to other vehicle systems through a vehicle bus such as a Controller Area Networking (CAN) bus 34, for example. However, in those cases (e.g. older vehicle, low-tier automobile, motorcycle, industrial vehicle, etc.) where a controller is not already existing, it is envisioned that a separate controller is provided in a standalone apparatus with appropriate wiring to the necessary systems.

In a preferred embodiment, the present invention includes an ignition switch status detector 18 wherein the ignition switch must be ON for the apparatus to operate. This feature helps discriminate the activation of the apparatus from that of a theft alarm system. In particular, having an accident detection system activate while the ignition switch is ON indicates that there is a driver in the vehicle that may need assistance. Alternatively, an occupant sensor 19, as is known in the art, can be incorporated into the apparatus to detect an occupant that might need assistance in the event of a crash. Further, a speed detector 17 can be included to indicate that the vehicle was moving at the time of the crash, or moving above a predetermined rate of speed at the time of the crash. Speed can be readily attained from the vehicle bus in today's vehicles. Neither of these situations are envisioned in a theft alarm scenario and would only be encountered in an accident scenario. Any and all of these possibilities can be combined to control the operation of the apparatus. For example, the controller 16 could input any or all of these signals (as shown) to decide whether to activate the apparatus 10. Conversely, these signals could be used to gate those signals from the accident detector 12 (not shown). It should be recognized that there are many various combinations that could be used, and all of these possible combinations are applicable in the present invention.

There are various means for detecting an accident or crash. As shown for the accident detector 12, a tilt sensor 22, accelerometer 20 and air bag deployment sensor 24 can be used. It should be recognized that there are many other types of accident detection that could be used, and all of these possible combination are applicable in the present invention. Most all new automobiles incorporate air bag systems. Those with OnStar™ systems can detect air bag deployment and place a call through an onboard cellular device 32 to a remote call center for assistance. The present invention can beneficially use this existing air bag deployment signal 24.

Similarly, air bag systems typically incorporate an accelerometer to trigger the airbag. The accelerometer signal 20 could be accessed directly in the accident detector 12 to indicate a crash, wherein an acceleration greater than a predetermined limit is indicative of a crash. For those vehicles without an air bag system (e.g. older vehicle, low-tier automobile, motorcycle, industrial vehicle, etc.), it is envisioned that a separate accelerometer is provided in a standalone apparatus. Alternatively, the accident detector 12 can incorporate a tilt sensor 22, wherein a vehicle tilt greater than a predetermined limit is indicative of a crash. It should be recognized that the tilt sensor can have various configurations including an inclinometer, rollover sensor, and the like. The use of a tilt sensor is particularly applicable for motorcycles which generally come to rest on their side after a crash or accident.

The external alert system 14 includes at least one of the existing vehicle horn 28 and vehicle lights 26. The lights 26 can include one or more of the headlights, tail lights, turn signal lights, brake lights, interior lights, or any available or added lights in or on the vehicle. In operation, the external alert system controls the vehicle lights to flash and horn to sound repeatedly when an accident is detected by the accident detector. Preferably, the external alert system controls the horn to sound in a predefined sequence to draw more attention to the vehicle and to distinguish it from a theft alarm. For example, the horn (and lights) could be sequenced to provide a Morse code SOS, i.e. three short alerts, followed by three longer alerts, followed up by three short alerts again. Typical vehicles include horns and lights. However, the present invention can also include a standalone alert 30 that can include light, sound, synthesized voice, motion or other means to attract attention. For example, a separate alert can be added, such as is available in alarm systems, to provide a special audio signal to attract attention.

In all of the above cases it would be desirable to couple the actions of the apparatus 10 with a cellular device 32 for further assistance. The cellular device 32 could be a standalone unit supplied with the apparatus, a user's existing portable radiotelephone which can be coupled by wire or wirelessly to the apparatus 10, or an onboard Telematics cellular transceiver in the vehicle (e.g. OnStar™).

Referring to FIG. 2, the present invention also incorporates a method of providing localized accident notification. In its simplest form, the method 100 includes the steps of detecting 102 an accident in a vehicle, and providing 104 an external alert to passers-by. As previously explained, the detecting 102 an accident can be predicated on other conditions. In one example, it must first be determined 106 that the ignition is on. In another example, it must first be determined 108 that an occupant is present in the vehicle. In still another example, it must first be determined 110 if the vehicle is moving during the accident. In still another example, it must first be determined if the vehicle stability system (e.g. skid control system) has been activated. Any or all of these conditions 106, 108, 110 can be implemented before an accident can be detected 102.

In a preferred embodiment, the detecting step 102 includes detecting a tilt of the vehicle, wherein a tilt that is greater than a predetermined limit is indicative of an accident. In addition, the detecting step 102 can include detecting a deployment of an air bag as an indication of an accident. Further, the detecting step 102 can include detecting an acceleration of the vehicle, wherein an acceleration greater than a predetermined limit is indicative of an accident.

Upon detecting an accident 102, the providing step 104 includes providing at least one of the group of sounding the vehicle horn and flashing the vehicle lights. Preferably, these are existing systems in the vehicle. To distinguish from a theft alarm, the providing step 104 can include sounding the vehicle horn in a predefined sequence. Alternatively, a separate alert can be added, such as is available in alarm systems, to provide a special audio signal, such as previously described for example. Optionally, the providing step 104 can include providing a manual activation control for the external alert.

For rescue workers, it would be desirable to provide a technique for disabling the alert system, so as to avoid distraction and confusion. For example, it is envisioned that the alerting step can be disabled by cycling the ignition switch from ON to OFF a predetermined number of times. Alternatively, a separate disconnect switch or button can be provided. It should be recognized that there are many techniques that can be implemented for disabling the alert function of the present invention.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A localized accident notification apparatus for a vehicle comprising:
    an accident detection system for determining at a time of the accident that an ignition switch of the vehicle is on and that there is an occupant in the vehicle, for detecting a) a tilt signal of the vehicle, wherein a tilt that is greater than a predetermined limit is indicative of an accident, b) an air bag deployment signal wherein deployment of an airbag is an indication of an accident, and c) an accelerometer signal, wherein an acceleration greater than a predetermined limit is indicative of an accident;
    an external alert, system, wherein the external alert system controls the vehicle lights to flash and horn to sound in a predefined sequence when a crash is detected by the accident detection system;
    a controller coupled to the accident detection system and external alert system, wherein upon an indication of a crash from the accident detection system the controller directs the external alert system to provide an external alert; and
    a cellular device coupled to the controller to receive an indication of the crash from the controller to call for assistance.

2. The apparatus of claim 1, further comprising an ignition switch status detector wherein the ignition switch must be on for the apparatus to operate.

3. The apparatus of claim 1, wherein the external alert system includes at least one of the vehicle horn and the vehicle lights.

4. The apparatus of claim 1, wherein a vehicle tilt greater than a predetermined limit along with an acceleration greater than a predetermined limit is indicative of an accident.

5. A method of providing localized accident notification, the method comprising the steps of:
- detecting an accident in a vehicle by determining at a time of the accident that an ignition switch of the vehicle is on and that there is an occupant in the vehicle, by detecting a) a tilt signal of the vehicle, wherein a tilt that is greater than a predetermined limit is indicative of an accident, b) an air bag deployment signal wherein deployment of an airbag is an indication of an accident, and c) an accelerometer signal, wherein an acceleration greater than a predetermined limit is indicative of an accident;
- providing an external alert by at least one of a) sounding the vehicle horn in a predefined sequence, b) flashing the vehicle lights, and c) manual activation control of the external alert; and
- directing a cellular device to call for assistance, wherein the cellular device is taken from the list comprising the vehicle's portable radiotelephone, a cellular communication device of the vehicle, and a Telematics cellular transceiver in the vehicle.

6. The method of claim 5, wherein a vehicle tilt greater than a predetermined limit along with an acceleration greater than a predetermined limit is indicative of an accident.

7. A localized accident notification apparatus for a vehicle comprising:
- an ignition switch status detector, wherein the ignition switch must be on for the apparatus to operate;
- an occupant detector for detecting that there is occupant is in the vehicle;
- an accident detector, the accident detector comprising a tilt sensor wherein a tilt greater than a predetermined limit is indicative of an accident, an air bag deployment signal wherein deployment of an airbag is an indication of an accident, and an accelerometer wherein an acceleration greater than a predetermined limit is indicative of an accident;
- an external alert system for sounding a horn of the vehicle;
- a controller coupled to the accident detector, the occupant detector and external alert system, wherein upon an indication of a crash from the accident detector and output from the occupant detector, the controller directs the external alert system to sound the horn; and
- a cellular device coupled to the controller to receive an indication of the crash from the controller to call for assistance.

8. The apparatus of claim 7, wherein a vehicle tilt greater than a predetermined limit along with an acceleration greater than a predetermined limit is indicative of an accident.

9. The apparatus of claim 7, wherein the external alert system also flashes at least one light of the vehicle.

* * * * *